United States Patent
Hu et al.

(10) Patent No.: US 7,987,164 B2
(45) Date of Patent: Jul. 26, 2011

(54) METHOD AND SYSTEM FOR SPEEDING UP REBUILD OF USER-DEFINED INDEXES DURING PARTITION MAINTENANCE OPERATIONS IN THE DATABASE SYSTEMS

(75) Inventors: Ying Hu, Nashua, NH (US); Seema Sundara, Nashua, NH (US); Jagannathan Srinivasan, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 273 days.

(21) Appl. No.: 12/007,325

(22) Filed: Jan. 9, 2008

(65) Prior Publication Data

US 2009/0177622 A1 Jul. 9, 2009

(51) Int. Cl.
G06F 7/00 (2006.01)
G06F 17/00 (2006.01)
(52) U.S. Cl. ......................................... 707/696; 707/702
(58) Field of Classification Search .................. None
See application file for complete search history.

(56) References Cited

U.S. PATENT DOCUMENTS

| 6,816,853 | B1 * | 11/2004 | Agarwal et al. | 707/3 |
| 7,035,851 | B1 * | 4/2006 | Sinclair et al. | 707/7 |
| 2002/0184253 | A1 * | 12/2002 | Agarwal et al. | 707/206 |
| 2004/0122828 | A1 * | 6/2004 | Sidle et al. | 707/100 |
| 2004/0199530 | A1 * | 10/2004 | Avadhanam et al. | 707/100 |
| 2005/0027692 | A1 * | 2/2005 | Shyam et al. | 707/3 |
| 2005/0182762 | A1 * | 8/2005 | Srinivasan et al. | 707/3 |
| 2008/0228802 | A1 * | 9/2008 | Marshall | 707/102 |

* cited by examiner

Primary Examiner — Kuen S Lu
Assistant Examiner — Tuan Pham
(74) Attorney, Agent, or Firm — Murphy & King, P.C.

(57) ABSTRACT

A method, system, and computer program product provides improved performance for rebuild of user-defined indexes during partition maintenance operations (partition split, merge, and move). A method of maintaining a index of a partitioned database table comprises performing a partition maintenance operation on the partitioned database table wherein a plurality of rows of the partitioned database table are moved from one partition to another, storing mapping information for at least some of the plurality of moved rows, including an old mapping for each of the moved rows and a corresponding new mapping for each of the moved rows, and when rebuilding the index, replacing an old mapping in the index for each of the plurality of moved rows with the corresponding stored new mapping for each of the plurality of moved rows.

6 Claims, 5 Drawing Sheets

US 7,987,164 B2

METHOD AND SYSTEM FOR SPEEDING UP REBUILD OF USER-DEFINED INDEXES DURING PARTITION MAINTENANCE OPERATIONS IN THE DATABASE SYSTEMS

BACKGROUND OF THE INVENTION

1. Field of the Invention

The present invention relates to a system, method, and computer program product for providing improved performance for rebuild of user-defined indexes during partition maintenance operations (partition split, merge, and move).

2. Description of the Related Art

Several database systems, support user-defined indexes that are used in many emerging applications. For example, text indexes are used for keyword search, spatial R-tree or Quadtree indexes are used for multi-dimensional space search, and XML indexes are used for XML document search and retrieval. The basic mechanism of some prior art user-defined indexes is described in U.S. Pat. No. 5,893,104 "Method and system for processing queries in a database system using index structures that are not native to the database system". These user-defined indexes may also be called domain indexes.

Several database systems also support partitioned tables that are very useful, especially for enterprise systems in which tables can become very large. Such database systems may support non-partitioned and local-partitioned user-defined indexes on partitioned tables. However, in such systems, the local-partitioned user-defined indexes must be rebuilt from scratch, as are native indexes, when partition maintenance operations are performed on the partitioned tables. In general, user-defined indexes are much more expensive to rebuild from scratch than native indexes, such as B-tree or bitmap indexes. A need arises for a technique for speeding up rebuild of user-defined indexes during partition maintenance operations (partition split, merge, and move).

SUMMARY OF THE INVENTION

The present invention provides a system, method, and computer program product for providing improved performance for rebuild of user-defined indexes during partition maintenance operations (partition split, merge, and move). Although partition split, and merge or move are common operations, partition move is becoming important recently to support Information LifeCycle Management (ILM) applications, where old (or inactive) data is moved to relatively cheaper storage. The present invention supports rebuilding user-defined or domain index partitions much more efficiently during table partition maintenance operations. The present invention improves partition maintenance performance. Because many computations are saved, and some index structures are reused for rebuilding user-defined index partition, the time to complete the table partition maintenance DDL statements is greatly reduced. In addition, present invention provides improved ease of implementation. Since a row identifier (rowid) mapping table provides a simple abstraction between database kernel and user-defined indexing scheme, a user can easily work on the new scheme to support rebuilding the user-defined index partition.

A method of maintaining a index of a partitioned database table comprises performing a partition maintenance operation on the partitioned database table wherein a plurality of rows of the partitioned database table are moved from one partition of the database table to another partition of the database table, storing mapping information for at least some of the plurality of moved rows, the stored mapping information including an old mapping for each one of the at least some of the plurality of moved rows and a corresponding new mapping for each one of the at least some of the plurality of moved rows, and when rebuilding the index, replacing an old mapping in the index for each one of the at least some of the plurality of moved rows with the corresponding stored new mapping for each one of the at least some of the plurality of moved rows.

The partition maintenance operation may comprise at least one of a partition split operation, a partition merge operation, and a partition move operation. The partition maintenance operation may be performed by a plurality of processes in parallel and the stored mapping information is shared among the plurality of processes. The stored mapping information may comprise row identifiers. The old mapping may comprise a row identifier of a location of a row before the row was moved, and the new mapping comprises a row identifier of a location of the row after the row was moved. The index may be a user-defined index.

BRIEF DESCRIPTION OF THE DRAWINGS

Further features and advantages of the invention can be ascertained from the following detailed description that is provided in connection with the drawings described below.

DETAILED DESCRIPTION OF THE PREFERRED EMBODIMENTS

The present invention provides a system, method, and computer program product for providing improved performance for rebuild of user-defined indexes during partition maintenance operations (partition split, merge, and move). Although partition split, and merge or move are common operations, partition move is becoming important recently to support Information LifeCycle Management (ILM) applications, where old (or inactive) data is moved to relatively cheaper storage. The present invention supports rebuilding user-defined or domain index partitions much more efficiently during table partition maintenance operations. The present invention improves partition maintenance performance. Because many computations are saved, and some index structures are reused for rebuilding user-defined index partition, the time to complete the table partition maintenance DDL statements is greatly reduced. In addition, present invention provides improved ease of implementation. Since a row identifier (rowid) mapping table provides a simple abstraction between database kernel and user-defined indexing scheme, a user can easily work on the new scheme to support rebuilding the user-defined index partition.

Figure 1:
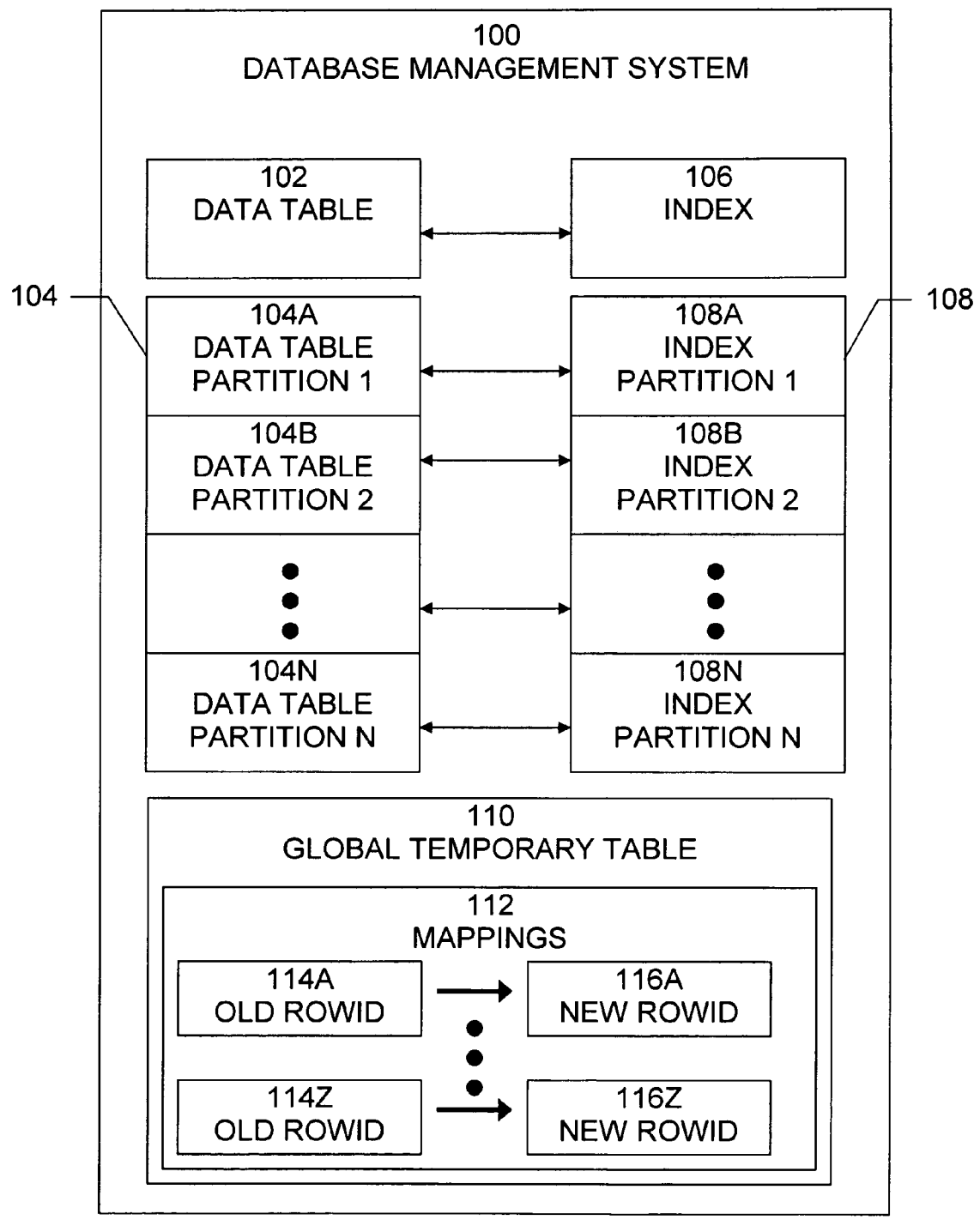
FIG. 1 is an exemplary block diagram of a database management system in which the present invention may be implemented.

An example of a database management system (DBMS) 100, in which the present invention may be implemented, is shown in FIG. 1. DBMS 100 includes one or more data tables, such as data tables 102 and 104. Associated with each data table is an index. Use of the index provides fast and efficient performance of queries on the data in the data table. For example, associated with data table 102 is an index, such as index 106, that has been built on the data table. Data table 104 is an example of a partitioned data table. A data table may be partitioned when the complete table is too large to allow efficient database processing of the table. Data table 104 includes a plurality of partitions, such as data table partition 1 104A, data table partition 2 104B, and data table partition N 104N. Each data table 102 or data table partition 104A-104N includes a plurality of rows of data. Index 108 is associated with data table 104 and has been built on the data in data table 104. Thus, index 108 includes a plurality of partitions, such as index partition 1 108A, index partition 2 108B, and index partition N 108N. Each partition of index 108 corresponds to a partition of data table 104. Thus, index partition 108A corresponds to data table partition 104A, and indexes the rows of data in that partition. When rows of data are moved from one partition to another, such as during a partition maintenance operation, the corresponding index partitions must be updated to reflect the new locations of the rows that have been moved.

Index 106 and index 108 may be native indexes, that is indexes that are automatically generated by DBMS 100. Alternatively, or in addition, index 106 and/or index 108 may be user-defined indexes, that are generated based on definition information provided by a user of DBMS 100. DBMS 100 also includes global temporary table 110. Global temporary table 110 stores mapping information 112, which includes mappings of old rowids 114A-Z to new rowids 116A-Z. In particular, old rowids 114A-Z include ids of the old or original location of rows of data that are moved during a partition maintenance operation. New rowids include ids of the new location of rows of data that are moved during a partition maintenance operation. Mapping information 112 includes the old and new rowids along with the mapping indicating the correspondence of each old and new rowid.

Figure 2:
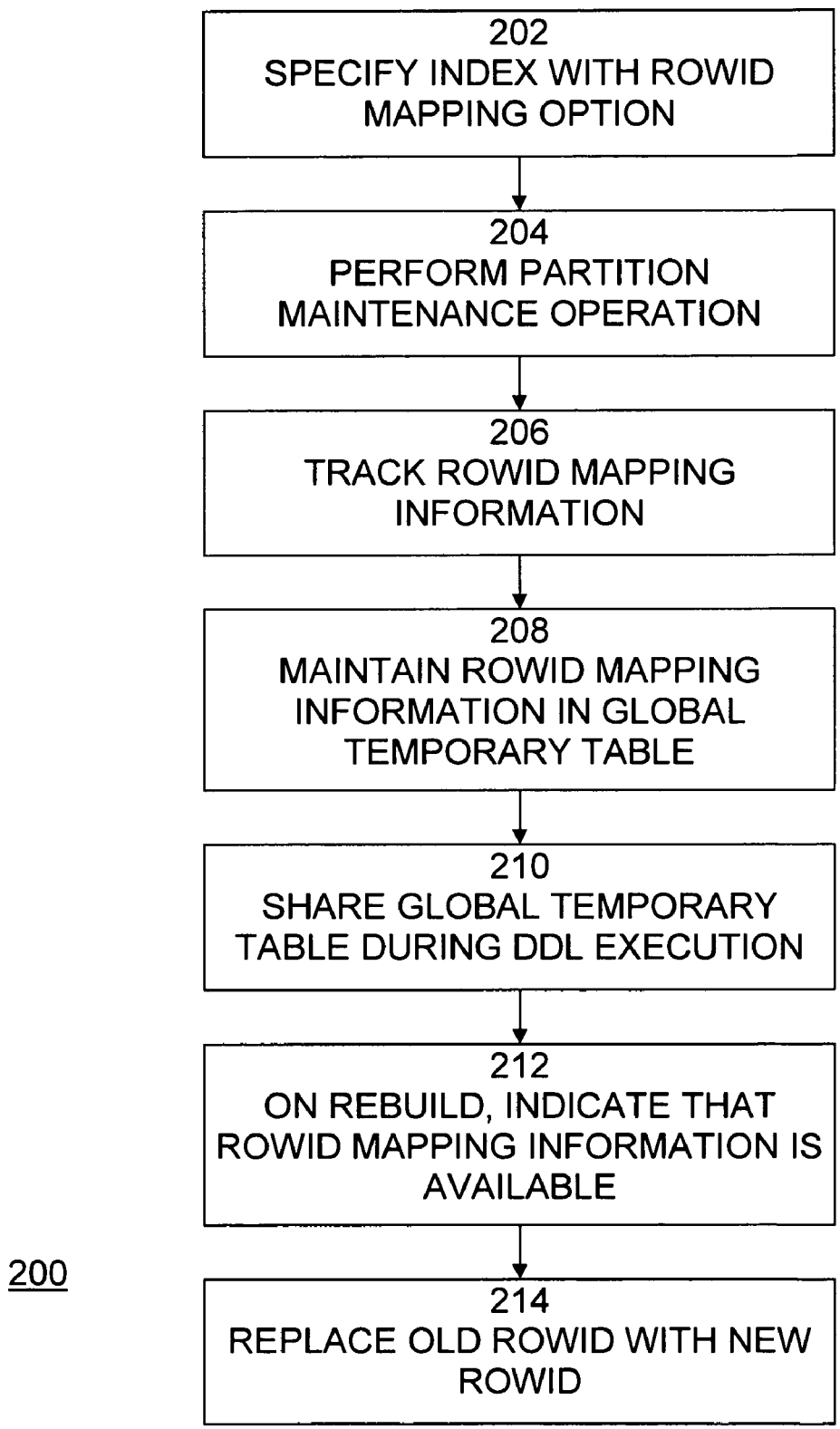
FIG. 2 is an exemplary flow diagram of an index updating process.

An exemplary process 200 of improved index updating is shown in FIG. 2. It is best viewed in conjunction with FIG. 1. Process 200 begins with step 202, in which a user-defined indexing scheme (or indextype) can be specified with a new option—rowid mapping. In step 204, during partition maintenance operations, such as split, merge and move, the rows in the base table physically move from one partition to another. For example, rows may move from data table partition 104A to data table partition 104B. Hence, the row identifier of the rows changes.

In step 206, when a local user-defined index, such as index 108, whose indextype is specified with rowid mapping, is created on partitioned tables, such as table 104, the DBMS 100 will keep track of the old to new rowid mapping information for affected rows during partition maintenance operations on the base table. In step 208, the old to new rowid mapping information is stored and maintained in a special global temporary table 110.

In step 210, when the partition maintenance data definition language (DDL) is executed in parallel, the global temporary table 110 can be shared by the query coordinator and each of the parallel slaves working on the same partition maintenance DDL statement. The contents of global temporary table 110 is complete from the query coordinator's point of view, while each slave is just working on a portion of global temporary table 110. Moreover, since this is a temporary table, its contents are invisible to other sessions working on different statements.

In step 212, once the user-defined index starts to rebuild the affected index partition(s), the database system passes in a flag indicating that the rowid mapping information is available. As a result, in step 214, the indextype code will just replace the old rowid with the new rowid for the affected partition(s), and avoid the whole user-defined index partition rebuild from scratch.

The reason to stash away the old to new rowid mapping information is that user-defined index partition creation normally involves much more complex computations and builds much more complex index structures than those of native B-tree and bitmap indexes. For example, text index partition creation involves parsing and tokenizing each text document, and then building inverted-list indexes which hold lists of (keyword: (docid1, position1), (docid2, position2), . . . ) and the translation tables between rowid and docid. However, when partition maintenance operation occurs, the contents of the affected text index partitions don't change. The data just moves from one partition to another and only the row identifiers of the rows in the affected partition changes. Hence, by simply replacing the old rowids with the new rowids, the text indexes save not only the computations of parsing and tokenizing documents, but also the rebuilding of the inverted-list indexes. Now the text index partition rebuild is just to replace the old rowid with new rowid in the translation tables between rowid and docid.

If the table partition maintenance operation is executed serially, the system simply inserts the affected rows into the temporary table. If the table partition maintenance operation is executed by parallel slaves, one (shared) incarnation for each slave is allocated, and shared between the query coordinator and one slave. Therefore the query coordinator is responsible for space management (segment creation, adding new extent) while the slave performs the parallel insert.

Figure 3:
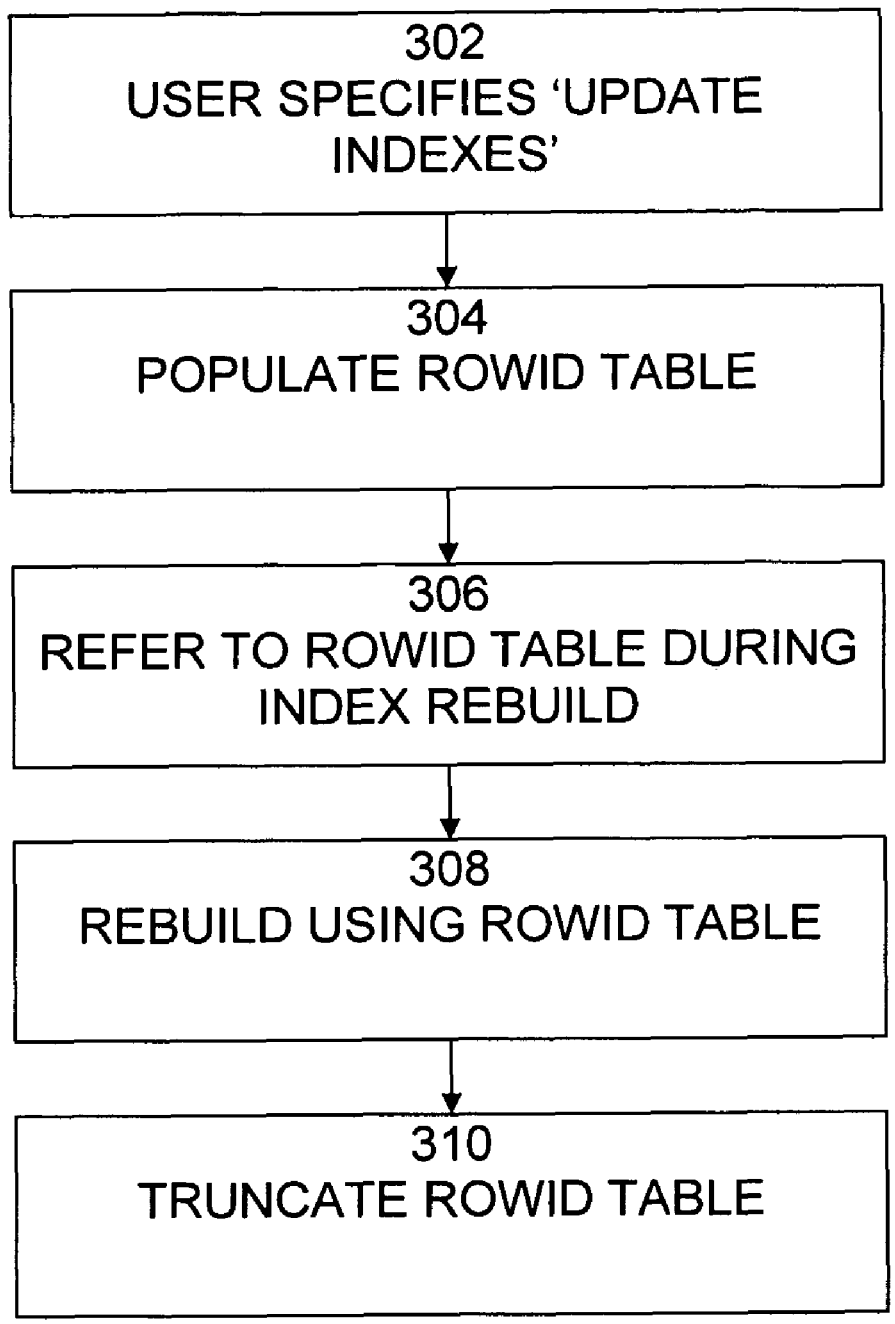
FIG. 3 is an exemplary flow diagram of an index updating process.

A specific example of a process 300 of updating text indexes, with indextypes specified with rowid mapping, is shown in FIG. 3. Process 300 begins with step 302, in which the user specifies the 'update indexes' clause along with the partition maintenance DDL. As a result, the ODCIEnv flag will have the "RebuildIndex" option set and the indextype can perform the optimized index partition rebuild. In step 304, for the user-defined indexes built using an indextype that has been specified with the WITH ROWID MAPPING clause, the SYS.ODCI_PMO_ROWIDS$ table will be populated by the server. In step 306, the text indextype code in ODCIIndexSplitPartition/ODCIIndexMergePartition refers to this table to rebuild their index partitions optimally. In step 308, a subsequent call to ODCIIndexAlter to rebuild the text index as part of the partition maintenance operation will have the "RebuildPMO" option set and the text indextype can now opt to treat the rebuild as a no-op in the case of splitting or merging partition. In the case of moving partition, the indextype code will refer to the rowid mapping table to rebuild the affected index partition optimally. In step 310, the PMO_ROWIDS$ table is truncated in the end.

Figure 4:
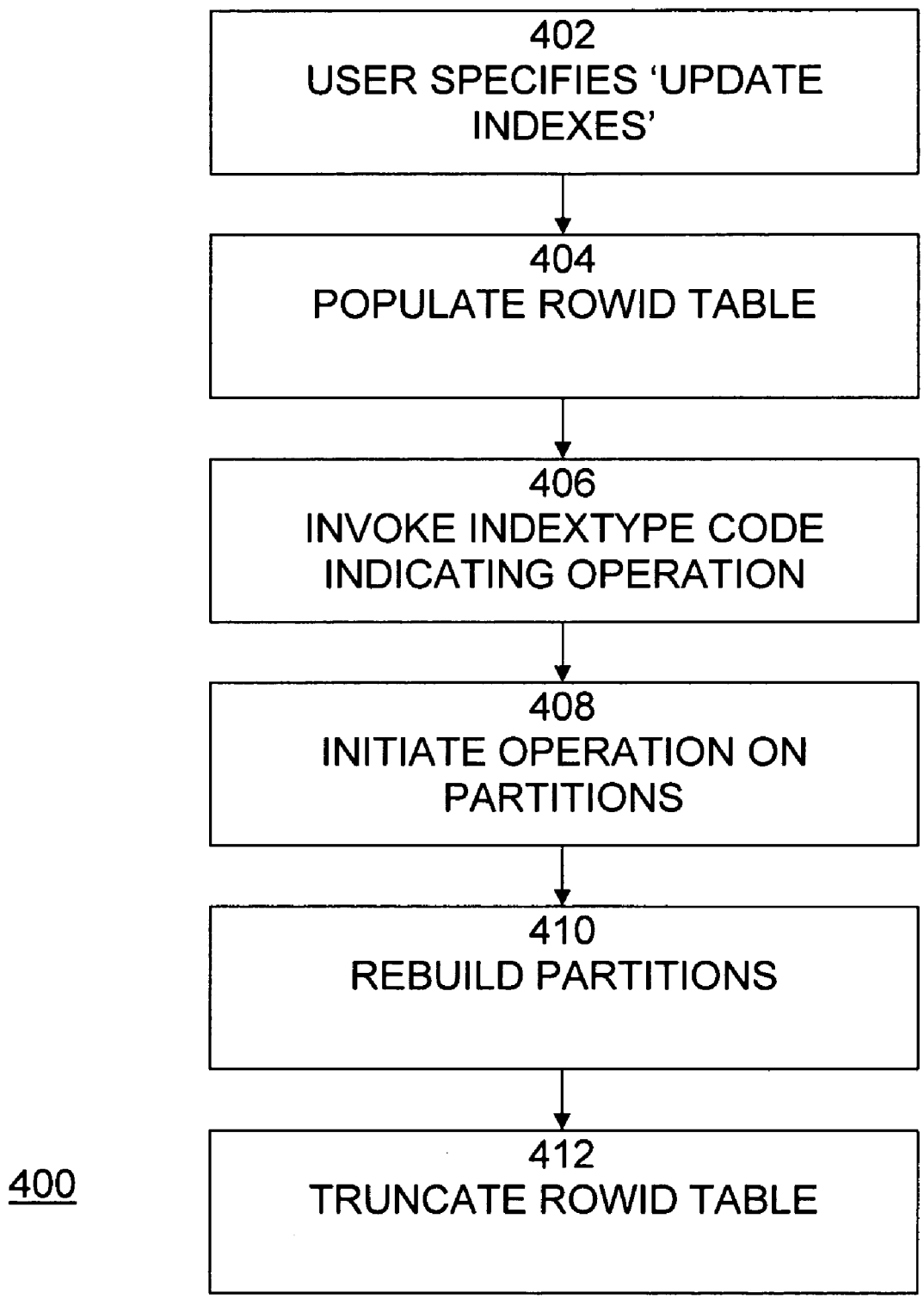
FIG. 4 is an exemplary flow diagram of an index updating process.

The present invention is also applicable to more generic cases of system-managed user-defined indexes. Such system-managed user-defined indexes are described in U.S. Pat. No. 6,920,460 "Systems and methods for managing partitioned indexes that are created and maintained by user-defined indexing schemes", while a process 400, which applies the present invention in order to update a generic system-managed user-defined index is shown in FIG. 4. Process 400 begins with step 402, in which the user specifies the 'update indexes' clause along with the partition maintenance DDL. Then the ODCIEnv flag will have the "RebuildIndex" option set and the indextype can perform the optimized index partition rebuild. In step 404, for the user-defined indexes built using an indextype that has been specified with the WITH ROWID MAPPING clause, the SYS.ODCI_PMO_ROW-IDS$ table will be populated by the server.

In step 406, the indextype code in ODCIIndexUpdPart-Metada is invoked with the "RebuildIndex" option, indicating the operation to be performed on the affected index partitions, such as split, merged, or moved, rather than simply dropped. In step 408, the indicated operation is initiated on the affected index partitions. For merging partitions, the local user-defined index partitions are merged by kernel to maintain the one-to-one mapping between the base partitioned table and the local user-defined index. Since kernel may not know the user-defined index's optimized layout, kernel just puts the contents from the two index partitions together. The optimized layout for the resulting user-defined index partition is done in step 410 below. For splitting a partition, the affected local user-defined index partition is neither dropped nor split by kernel, but a new user-defined index partition is created and populated by cloning the affected user-defined index partition. Therefore, the one-to-one mapping between the base partitioned table and the local user-defined index is maintained. The real split work for the affected user-defined index partition is done in step 410 below. Hence, each of the resulting index partitions holds all the contents of the affected index partition(s) except with stale or old rowids. Note that if it is not with optimized rebuild, kernel just drops the affected partition(s) and adds new empty resulting partition(s).

In step 410, the affected partitions are actually rebuilt. A subsequent call to ODCIIndexAlter to rebuild the index as part of the partition maintenance operation will have the "RebuildPMO" option set and the indextype code can now refer to the PMO_ROWIDS$ table, and patch up the user-defined index partition(s) by replacing old rowids with new rowids. For the case of splitting partition, the indextype code will scan the affected index partition to check which rows/entries will be deleted and which will be kept, and finally replace the wrong or old rowids with new rowids. For the case of merging partitions, the indextype code may not only replace the wrong or old rowids with new rowids, but also compact the resulting partition entries based on its own optimized layout. For the case of moving a partition, the indextype code can simply replace the old rowids with new rowids.

In step 412, the PMO_ROWIDS$ table is truncated in the end.

Figure 5:
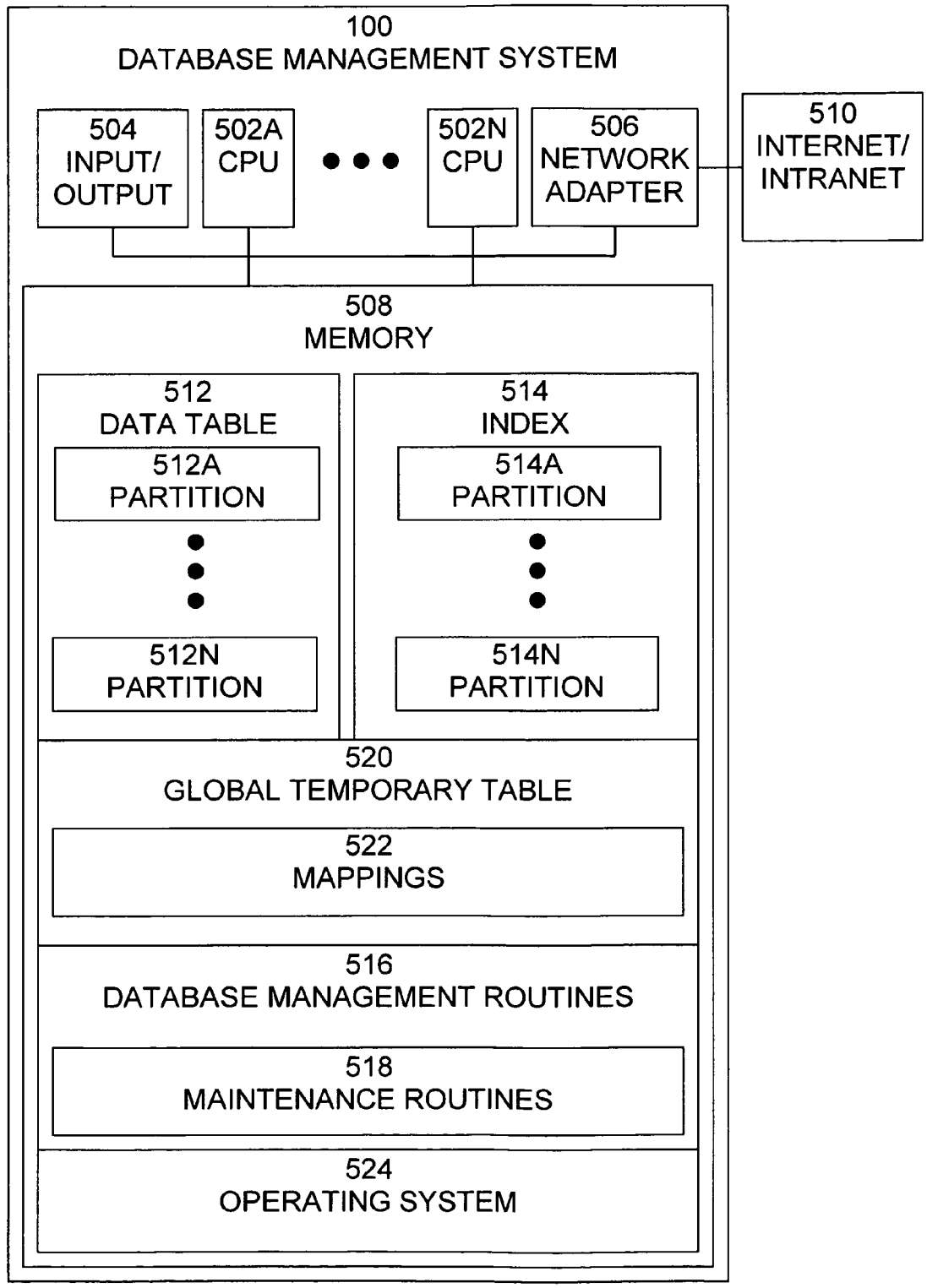
FIG. 5 is an exemplary block diagram of a database management system, in which the present invention may be implemented.

An exemplary block diagram of a database management system (DBMS) 100, shown in FIG. 1, is shown in FIG. 5. DBMS 100 is typically a programmed general-purpose computer system, such as a personal computer, workstation, server system, and minicomputer or mainframe computer. DBMS 100 includes one or more processors (CPUs) 502A-502N, input/output circuitry 504, network adapter 506, and memory 508. CPUs 502A-502N execute program instructions in order to carry out the functions of the present invention. Typically, CPUs 502A-502N are one or more microprocessors, such as an INTEL PENTIUM® processor. FIG. 5 illustrates an embodiment in which DBMS 100 is implemented as a single multi-processor computer system, in which multiple processors 502A-502N share system resources, such as memory 508, input/output circuitry 504, and network adapter 506. However, the present invention also contemplates embodiments in which DBMS 100 is implemented as a plurality of networked computer systems, which may be single-processor computer systems, multi-processor computer systems, or a mix thereof.

Input/output circuitry 504 provides the capability to input data to, or output data from, DBMS 100. For example, input/output circuitry may include input devices, such as keyboards, mice, touchpads, trackballs, scanners, etc., output devices, such as video adapters, monitors, printers, etc., and input/output devices, such as, modems, etc. Network adapter 506 interfaces DBMS 100 with Internet/intranet 510. Internet/intranet 510 may include one or more standard local area network (LAN) or wide area network (WAN), such as Ethernet, Token Ring, the Internet, or a private or proprietary LAN/WAN.

Memory 508 stores program instructions that are executed by, and data that are used and processed by, CPU 502 to perform the functions of DBMS 100. Memory 508 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

The contents of memory 508 vary depending upon the function that DBMS 100 is programmed to perform. One of skill in the art would recognize that these functions, along with the memory contents related to those functions, may be included on one system, or may be distributed among a plurality of systems, based on well-known engineering considerations. The present invention contemplates any and all such arrangements.

In the example shown in FIG. 5, memory 508 includes data table 512, which includes partitions 512A-512N, index 514, which includes partitions 514A-514N, database management routines 516, which include maintenance routines 518, global temporary table 520, which includes mappings 522, and operating system 524. Data table 512 is a partitioned data table, which includes a plurality of partitions, such as partitions 512A-512N. A data table may be partitioned when the complete table is too large to allow efficient database processing of the table. Index 514 is associated with data table 512 and has been built on the data in data table 512. Thus, index 514 includes a plurality of partitions, such as partitions 514A-514N.

Database management routines 516 include software routines that provide the database management functionality of DBMS 100. Database management routines typically include a database query language interface, such as a Structured Query Language (SQL) interface, and database processing routines to carry out the operations specified by the SQL. For example, an SQL interface accepts database queries using the SQL database query language, calls the database processing routines to perform the series of operations, and returns the results of the query to the source of the query. In particular, database management routines 516 include maintenance routines 518, which implement the partition maintenance processes shown in FIGS. 2-4. Global temporary table 520 stores the old to new rowid mapping information 522 that is stored by the partition maintenance processes shown in FIGS. 2-4. Operating system 524 provides overall system functionality.

As shown in FIG. 5, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and WINDOWS®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of maintaining an index of a partitioned database table stored in a memory of a computer system comprising, a processor and the memory, the method comprising:
    performing a partition maintenance operation on the partitioned database table stored in the memory using at least one table partition maintenance data definition language statement, wherein the partitioned database table has a user-defined index, and wherein a plurality of rows of the partitioned database table are moved from one partition of the database table to another partition of the database table;
    during the partition maintenance operation, storing mapping information in the memory for at least some of the plurality of moved rows, the stored mapping information comprising an old row identifier of a location of a row before the row was moved for each one of the at least some of the plurality of moved rows and a new row identifier of a location of the row after the row was moved for each one of the at least some of the plurality of moved rows along with a mapping indicating the correspondence between each old row identifier and each new row identifier, wherein the stored mapping information is stored in a global temporary table stored in the memory; and
    when rebuilding the index, replacing an old row identifier in the index for each one of the at least some of the plurality of moved rows with the corresponding stored new row identifier for each one of the at least some of the plurality of moved rows instead of rebuilding the index from scratch, wherein at least some of the original structures of the index are reused for rebuilding the index;
    wherein the partition maintenance operation is performed by a plurality of processes in parallel and the stored mapping information is shared among the plurality of processes using the global temporary table.

2. The method of claim 1, wherein the partition maintenance operation comprises at least one of a partition split operation, a partition merge operation, and a partition move operation.

3. A system for performing a database query comprising:
    a processor operable to execute computer program instructions;
    a memory operable to store computer program instructions executable by the processor; and
    computer program instructions stored in the memory and executable to perform the steps of:
    performing a partition maintenance operation on the partitioned database table using at least one table partition maintenance data definition language statement, wherein the partitioned database table has a user-defined index, and wherein a plurality of rows of the partitioned database table are moved from one partition of the database table to another partition of the database table;
    during the partition maintenance operation, storing mapping information for at least some of the plurality of moved rows, the stored mapping information comprising an old row identifier of a location of a row before the row was moved for each one of the at least some of the plurality of moved rows and a new row identifier of a location of the row after the row was moved for each one of the at least some of the plurality of moved rows along with a mapping indicating the correspondence between each old row identifier and each new row identifier, wherein the stored mapping information is stored in a global temporary table; and
    when rebuilding the index, replacing an old row identifier in the index for each one of the at least some of the plurality of moved rows with the corresponding stored new row identifier for each one of the at least some of the plurality of moved rows instead of rebuilding the index from scratch, wherein at least some of the original structures of the index are reused for rebuilding the index;
    wherein the partition maintenance operation is performed by a plurality of processes in parallel and the stored mapping information is shared among the plurality of processes.

4. The system of claim 3, wherein the partition maintenance operation comprises at least one of a partition split operation, a partition merge operation, and a partition move operation.

5. A computer program product for performing a database query comprising:
    a non-transitory computer readable storage medium;
    computer program instructions, recorded on the computer readable storage medium, executable by a processor, for performing the steps of
    performing a partition maintenance operation on the partitioned database table using at least one table partition maintenance data definition language statement, wherein the partitioned database table has a user-defined index, and wherein a plurality of rows of the partitioned database table are moved from one partition of the database table to another partition of the database table;

during the partition maintenance operation, storing mapping information for at least some of the plurality of moved rows, the stored mapping information comprising an old row identifier of a location of a row before the row was moved for each one of the at least some of the plurality of moved rows and a new row identifier of a location of the row after the row was moved for each one of the at least some of the plurality of moved rows along with a mapping indicating the correspondence between each old row identifier and each new row identifier, wherein the stored mapping information is stored in a global temporary table; and when rebuilding the index, replacing an old row identifier in the index for each one of the at least some of the plurality of moved rows with the corresponding stored new row identifier for each one of the at least some of the plurality of moved rows instead of rebuilding the index from scratch, wherein at least some of the original structures of the index are reused for rebuilding the index;

wherein the partition maintenance operation is performed by a plurality of processes in parallel and the stored mapping information is shared among the plurality of processes.

6. The computer program product of claim 5, wherein the partition maintenance operation comprises at least one of a partition split operation, a partition merge operation, and a partition move operation.

* * * * *